United States Patent [19]

Snuttjer et al.

[11] Patent Number: 4,870,393

[45] Date of Patent: Sep. 26, 1989

[54] METHOD AND APPARATUS FOR DETERMINING GENERATOR VENTILATION SYSTEM FAILURE USING TWO DIFFERENTIAL PRESSURE SENSORS

[75] Inventors: Owen R. Snuttjer, Oviedo; Peter L. Wilhelm, Winter Springs, both of Fla.

[73] Assignee: Westinghouse Electric Corp., Pittsburgh, Pa.

[21] Appl. No.: 179,098

[22] Filed: Apr. 8, 1988

[51] Int. Cl.[4] .............................................. G08B 21/00
[52] U.S. Cl. ................................ 340/611; 73/864.34; 73/708; 165/11.1; 165/37
[58] Field of Search ................ 340/611, 606; 73/708, 73/714, 736, 864.34; 376/277, 278, 282, 298, 306, 307; 364/558, 510, 172, 185; 165/11.1, 11.2, 32, 34, 37

[56] References Cited

U.S. PATENT DOCUMENTS

| 3,818,231 | 6/1974 | Gopal et al. | 364/510 |
|---|---|---|---|
| 3,972,225 | 8/1976 | Fort et al. | 340/516 |
| 4,031,950 | 6/1977 | Shultz | 364/185 |
| 4,055,844 | 10/1977 | Hornbostel, Jr. | 340/611 |
| 4,193,781 | 3/1980 | Vogel et al. | 62/181 |
| 4,249,238 | 2/1981 | Spang, III et al. | 364/185 |
| 4,293,853 | 10/1981 | Kubota | 340/611 |
| 4,392,417 | 7/1983 | Johannsen | 364/510 |
| 4,598,381 | 7/1986 | Cucci | 73/708 |
| 4,685,066 | 8/1978 | Hafele et al. | 364/510 |
| 4,753,284 | 6/1988 | Krause et al. | 165/34 |

Primary Examiner—Joseph A. Orsino
Assistant Examiner—Jill D. Jackson

[57] ABSTRACT

The ratio of the pressure change across a portion of the ventilation system of a hydrogen cooled electric power generator to the pressure increase across a reference blower, preferably the purity blower, is compared to a base ratio to generate an alarm when the difference in ratios exceeds a predetermined amount indicative of a failure within the ventilation system.

16 Claims, 2 Drawing Sheets

METHOD AND APPARATUS FOR DETERMINING GENERATOR VENTILATION SYSTEM FAILURE USING TWO DIFFERENTIAL PRESSURE SENSORS

BACKGROUND OF INVENTION

1. Field of Invention

This invention is directed to a method and apparatus for detecting failures in the blower and ventilation circuits in the ventilation system of a large electric power generator, and more particularly, to such a method and apparatus which detect such failures reliably from differential pressure measurements regardless of the purity or density of the cooling gas.

2. Background Information

Large electric generators are cooled with pressurized hydrogen and have an internal ventilation system which uses a blower to continuously circulate the gas through a gas cooler, and about the components to be cooled. This internal ventilating system's integrity must be maintained during operation to properly cool the generator. Blower failure, baffle failure and improper assembly have caused malfunctions in such ventilating systems.

During operation, the internal parts of the generator cannot be visually inspected, and hence the internal ventilation system is monitored by temperature measurements, and by measurements of the differential pressure across the generator blower, that is the difference between the inlet and outlet pressure of the blower. Monitoring of the temperature of course indicates when a portion of the unit is getting too hot. And monitoring of the generator blower differential pressure can indicate power failure. However, the present method is not completely satisfactory for monitoring the ventilating system because changes in blower pressure and the temperatures are not easily correlated with ventilation system failures. The blower pressure depends upon gas purity, pressure, and temperature which are not constant and make monitoring by measuring the blower pressure and temperatures impractical. Also, the temperatures in the circuits of the ventilation system are not measured at every point, and often only average temperatures are measured which may not reflect local changes in the ventilation circuits.

It is normal practice to monitor the purity of the ventilating system gas to detect any ingress of impurities into the generator gas. It is common to determine gas purity by monitoring the differential pressure across a constant displacement purity blower which extracts a stream of gas from the ventilating system and discharges it back into the system. It has been known to use the differential pressure across the generator blower as a back up means for determining gas purity. However, no reliable system for detecting failures in the ventilation using pressure measurements has been available.

In the meantime, major failures of the generator have occurred because damage or changes to the ventilation system during operation were not detected.

It is therefore a primary object of the invention to provide a reliable; simple system for detecting failures in the ventilation system of large gas cooled electric generator before major damage occurs.

It is a more particular object of the invention to provide such a system which utilizes pressure measurements in the ventilation system.

It is another particular object of the invention to provide such a system that takes advantage of equipment already available in the generator unit.

SUMMARY OF THE INVENTION

These and other objects are realized by the invention in which apparatus is provided to determine the ratio of the pressure change across a portion or portions of the ventilation system of a gas cooled generator to the pressure change across a reference pump independent of the ventilation system which pumps a sample of the cooling gas through a shunt to the ventilation system.

More particularly, a first differential pressure measuring means generates a first pressure differential signal representative of the pressure change across a selected portion of the ventilation system. A second differential pressure measuring means generates a second differential pressure signal representative of the pressure change across a pump through which a sample of the cooling gas is deviated by a conduit. Signal processing means generate an alarm signal when the ratio between the first and second pressure differential signals differs from a base ratio by a preselected amount.

The monitored portion of the ventilation system can be either the generator blower or a portion of the ventilation circuit, or both can be monitored and an alarm signal generated if the ratio of either to the reference differential pressure measured across the independent pump differs from an appropriate base ratio by the preselected amount. Preferably, the pump is a constant speed pump or blower, and ideally the purity blower for which the differential pressure is already monitored for determining gas purity as a function of its density can be used.

The resulting alarm system is a simple reliable means for detecting failure in the ventilation system of a gas cooled generator which is independent of changes in density of the cooling gas. Differences in the local densities of the gas at the measuring points due to differences in gas temperature and pressure can be compensated for by measuring the temperature of the cooling gas at the respective locations of the pressure measurements and adjusting the differential pressure readings accordingly.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENTS

The invention makes use of the fact that the volume output of a constant speed blower is essentially a function of the differential pressure between the inlet and outlet of the blower, assuming constant gas density. Therefore, the pressure increase across the blower is also essentially proportional to the gas density if the flow is constant. This can be mathematically expressed as:

$$Dp = f(Q) \times rho$$

where:

Dp is the pressure increase across the blower.
Q is the flow through the blower.
rho is the gas density.

If two blowers circulate the same gas then the ratio of the differential pressure increases across the blowers is:

$$\frac{Dp_1}{Dp_2} = \frac{f_1(Q_1) \times rho_1}{f_2(Q_2) \times rho_2}$$

where:

$Q_1$ and $Q_2$ are constant for given blower and ventilation circuit configurations.

If the assumption is made that pressure and temperature of the gas at the two blowers are the same, then:

$$rho_1 = rho_2$$

and $$\frac{Dp_1}{Dp_2} = \frac{f_1(Q_1)}{f_2(Q_2)}$$

If the pressure and temperature at the two blowers are not the same the differential pressures can be adjusted to increase accuracy, if desired, to correct for density differences in accordance with the following relationship:

$$D_{PA} = D_p \times \frac{P_A}{P} \times \frac{T}{T_A}$$

where:

$D_{PA}$ is the adjusted differential pressure
$D_P$ is the measured differential pressure
$P_A$ is the absolute pressure at the adjusted state
$P$ is the absolute pressure at the measured state
$T_A$ is the absolute temperature at the adjusted state
$T$ is the absolute temperature at the measured state From the above, it can be seen that the ratio of the pressure increase across the two blowers, with correction for local densities if required, is a constant for given blower and ventilation circuit configurations. If one blower is damaged or one ventilation circuit is changed the ratio of the two differential pressures will change. This change in ratio can be monitored to detect either a blower or a ventilation circuit failure. Similarly, the differential pressure across a portion of the ventilation circuit can be ratioed with a pressure increase from a reference blower. The pressure drop across the circuit can be given by:

$$Dp = \frac{K \times rho \times V^2}{2 \times g}$$

where:

Dp is the pressure drop
K is a constant
rho is the density
V is the gas velocity
g is the gravitation constant Since the velocity at a specific point is constant for a given ventilation circuit, and if the gas density in the circuit is constant, a change in the ratio of measured reference blower pressure increase and ventilation circuit pressure drop will also indicate a change in the blower or ventilation circuit. Again, corrections for differences in local gas density could be made to improve accuracy. The ratio can be monitored in the same way as the ratio for the pressure increase of two blowers.

Figure 1:
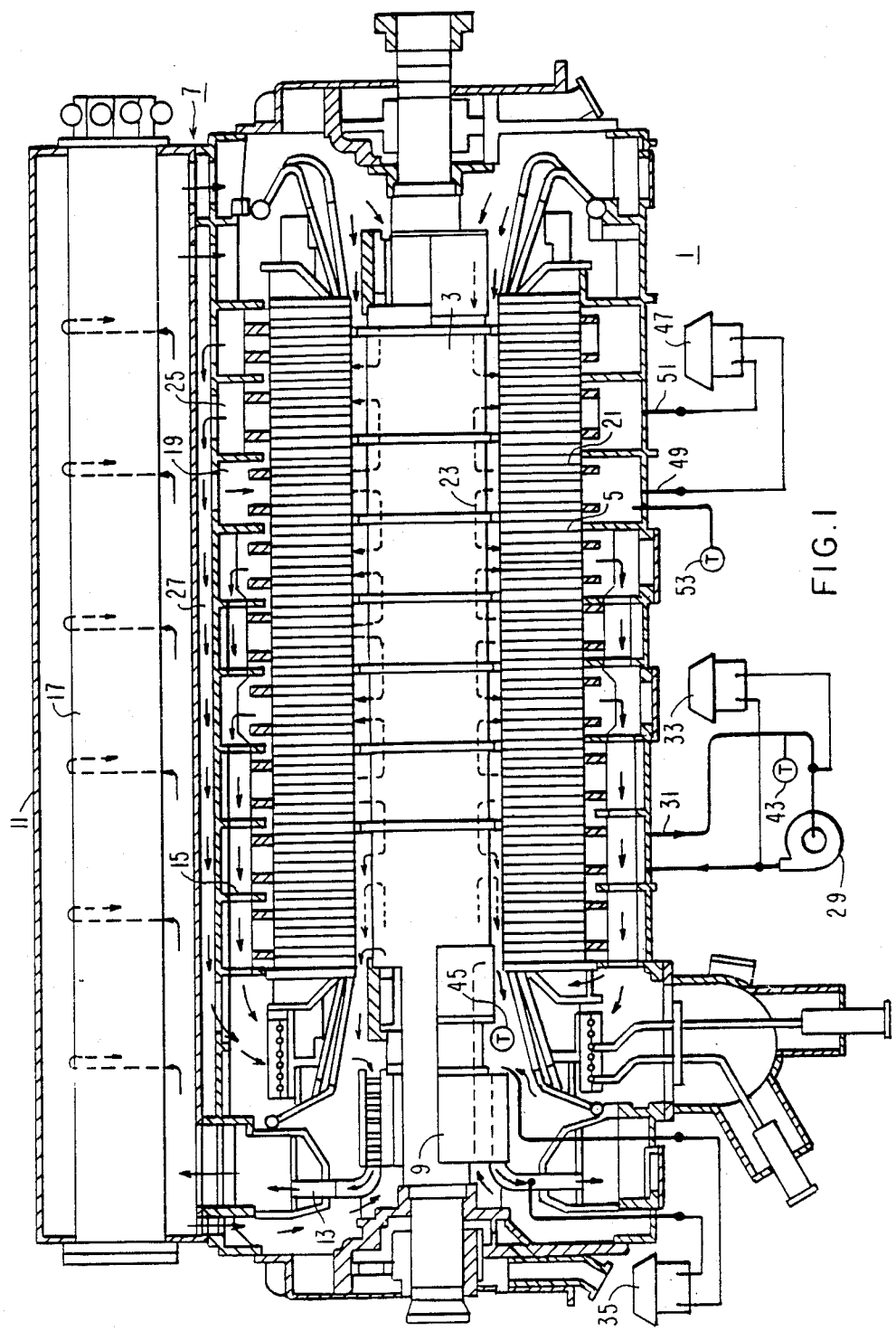
FIG. 1 is a vertical section through a hydrogen cooled electric power generator incorporating the invention.

FIG. 1 illustrates application of the invention to a large turbine driven, hydrogen gas cooled electric power generator 1. Generator 1 has a rotor 3 surrounded by a stator 5. A closed ventilation system 7 for the generator includes a generator blower 9 in the form of a turbine mounted on the rotor shaft, and a ventilation circuit 11 formed by ducts such as at 13 and baffles such as at 15 which direct the flow of hydrogen gas from the blower 9 through a water-gas heat exchanger 17 where heat is removed from the gas, into a number of annular compartments such as 19 surrounding the stator from which the gas passes through radial passages 21 in the stator into axial passages 23 in the rotor and out through adjacent radial passages in the stator into annular chambers such as 25, from which the gas passes through conduits such as 27 back to the generator blower. The ventilation circuit is designed to provide proper cooling to all parts of the generator.

As mentioned above, it is important to monitor the purity of the hydrogen gas circulating in the ventilating system to preclude the build-up of unacceptable hydrogen-air mixtures within the generator. It is common to monitor the purity by the use of a small purity blower 29. A conduit 31 in which the purity blower 29 is connected forms a shunt through which a sample of the cooing gas is extracted from the ventilation system 11, passed through the purity blower 29, and returned at essentially the same location in the ventilation system. A differential pressure transmitter 33 is connected to generate a signal representative of the pressure increase across the purity blower 29. This pressure differential signal is utilized in a known manner to determine the purity of the hydrogen gas circulated in the ventilation system.

A differential pressure transmitter 35 is also provided to monitor the pressure increase across the generator blower 9. While the signal generated by the differential pressure transmitter 35 is useful for detecting major deterioration in the performance the generator blower, it has heretofore not been possible to use this signal to detect smaller failures in the blower or failures within the ventilation circuit, due to the dependence of this signal on gas purity, pressure and temperature which are not constant, even during satisfactory operation of the ventilation system.

While substantial failure of the generator blower could be detected by the prior art technique of monitoring the pressure increase across the blower, the blower 9 is also susceptible to less drastic failures such as, for instance, failure of the blades in only one stage or part of one stage of the blower. In addition, it is possible for parts of the ventilation circuit to fail such as through the breaking or dislodging of baffles. Such failure of baffles can not only redirect the flow of cooling gas which can lead to damage through overheating of a portion of the generator, but also it has been known that broken pieces of baffle can cause electrical short circuits within the generator which can lead to catastrophic failure. It has been determined, however, that such catastrophic failures do not occur instantaneously, in that it takes some amount of time for the broken pieces of a baffle to find their way to a location where they can cause major damage. Thus, it has been determined that by monitoring the differential pressure across the blower motor and across the purity blower through the procedure discussed above, failures within the ventilation system can be detected in time to take action to prevent catastrophic failure to the generator.

Figure 2:
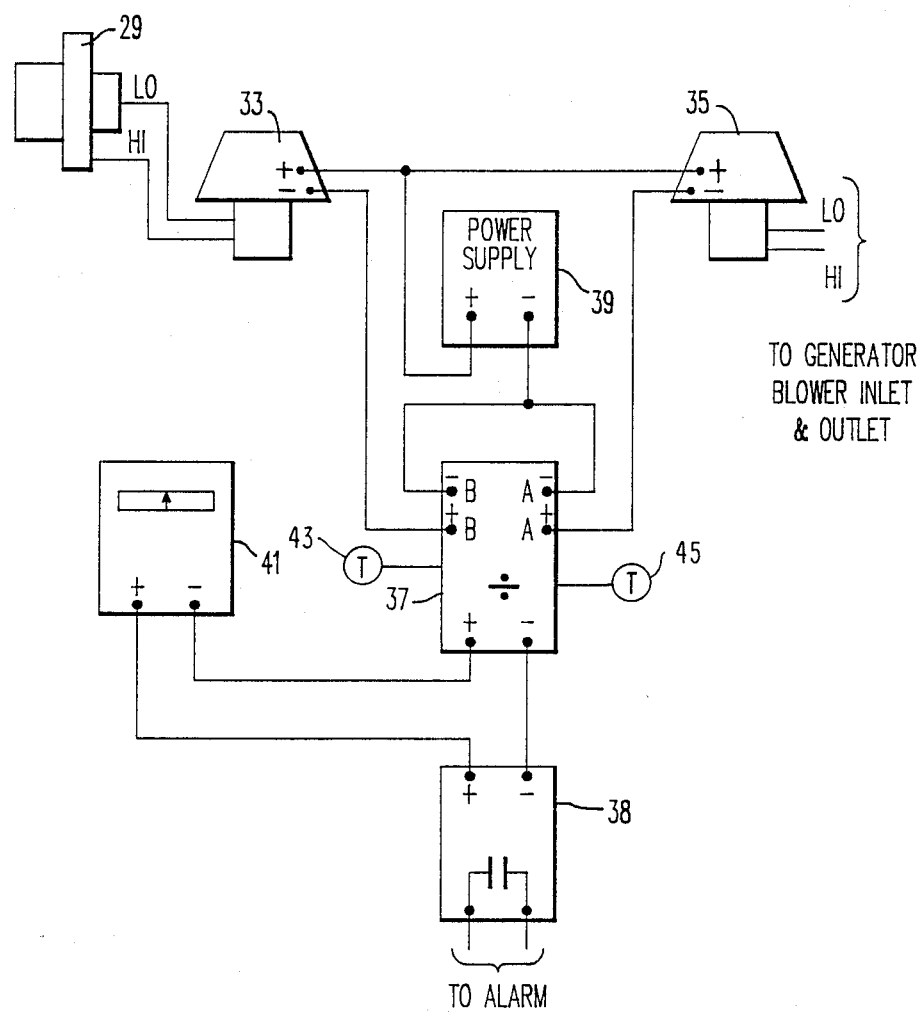
FIG. 2 is a schematic diagram of an electric circuit implementing one embodiment of the invention as applied to the electric power generator of FIG. 1.

Thus, in accordance with the invention, and as shown in FIG. 2, the differential pressure signal generated by the transmitter 33 connected to the purity blower 29, and the differential pressure signal generated by the transmitter 35 connected to the generator blower 9, are applied to an electronic divider 37 in a circuit powered by the power supply 39 to generate a signal representative of the ratio of the pressure increases across the two blowers. This ratio signal is applied to an alarm module 38 which compares the ratio signal with a base ratio signal to generate an alarm signal when the current signal differs from the base ratio signal by a predetermined amount. The ratio signal is also applied to an indicator 41 for constant readout of the current value of the ratio signal. Despite the large difference in size of the two blowers, the generator blower delivers about 75,000 cubic feet of cooling gas per minute with 200 inches of water increase in pressure, while the purity blower delivers only about one cubic foot of hydrogen gas per minute with three inches of water increase in pressure, the ratio signal remains within about 1% over the operating range of the generator with no failures. Thus, a ratio signal which differs by more than about 1% from the base ratio is an indication that there may be some deterioration in the ventilating system. Differences of about 2% or more warrant closer monitoring. It has been determined that a shift in the ratio of about 5% from the base ratio is an indication of a significant deterioration in the ventilation system which warrants investigation. The base ratio is established on startup of the generator when it is known that all the components of the ventilation system are in good working order.

Since it is not uncommon for the purity blower to be located at some distance from the generator, such that the temperature of the gas passing through the purity blower is significantly below that passing through the generator blower 9, temperature probes 43 and 45 can be placed at the inlet to the purity blower 29 and generator blower 9 to provide signals for correcting the ratio signal generated by the electronic divider 37.

It is not necessary that the purity blower be used to generate a reference differential pressure signal. A separate pump inserted in a conduit forming a shunt in the ventilation system can be used in its place. Preferably such a pump should be a constant speed pump or blower like the purity blower. It is preferable, and obviously much more economical to use the purity blower with its differential pressure transmitter where available.

As mentioned above, a differential pressure can be taken across a portion of the ventilating circuit, instead of, or in addition to, the differential pressure reading taken across the generator blower 9. Thus, as shown in FIG. 1, a differential pressure transmitter 47 can be installed to monitor the pressure drop between the annular chambers 19 and 25 in the ventilation circuit 11 through tubes 49 and 51. If necessary, temperature measurements may also be taken by temperature probe 53 along with sensor 43 at the purity blower 29 to correct for local differences in gas density due to temperature differences as in the case of a generator blower.

Monitoring of the ratio of the purity blower pressure increase to the pressure change across either the generator blower 9 or a portion of the ventilation circuit 11, will provide an indication of a significant failure of either part of the ventilation system, however, it is preferable to monitor the ventilation system both at the generator blower and in the ventilation system. Of course, the pressure drop in other portions of the ventilation circuit may also be ratioed with the pressure increase across the purity blower.

It should be evident from above that the invention provides a simple inexpensive means to monitor blower and ventilation circuit failures. It is relatively easy to incorporate into a diagnostic system, particularly so if the generator blower and purity blower outputs are used, since these signals are already available in present generator installations.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed:

1. An alarm system for detecting a ventilation system failure in an electric power generator having a closed ventilation system in which a cooling gas is circulated by a generator blower through a ventilation circuit, said alarm system comprising:
   first differential pressure measuring means generating a first differential pressure signal representative of a pressure change across a selected portion of the ventilation system;
   sampling means including:
   a pump;
   a conduit diverting a sample of the cooling gas from the ventilation system through said pump and back to the ventilation system; and
   second differential pressure measuring means generating a second differential pressure signal representative of a pressure change across said pump; and
   signal processing means generating an alarm signal when the ratio between the first and second differential pressure signals differs from a predetermined base ratio by a preselected amount.

2. The system of claim 1 where said pump is a constant speed pump.

3. The system of claim 2 including means for measuring cooling gas temperatures at said selected portion of the ventilation system and at said pump and wherein said signal processing means adjusts said ratio between the first and second differential pressure signals for differences in temperatures and pressure of the cooling gas at the selected portion of the ventilation system and at said pump.

4. The system of claim 2 wherein the selected portion of said ventilation system is said generator blower and said first differential pressure measuring means is connected across said generator blower to generate a first pressure signal representative of the pressure increase across said generator blower.

5. The system of claim 2 wherein the selected portion of said ventilation system is a designated portion of the ventilation circuit and said first differential pressure measuring means is connected across the designated portion of the ventilation circuit to generate a first differential pressure signal representative of the pressure drop across said designated portion of the ventilation circuit.

6. In combination:
an electric power generator;
a closed ventilation system for the generator including a ventilation circuit and a generator blower circulating hydrogen gas through said ventilation circuit;
a purity blower circulating a sample stream of hydrogen gas through a shunt in the ventilation system;
first differential pressure measuring means measuring the pressure change across a selected portion of said ventilation system;
second differential pressure measuring means measuring the pressure change across said purity blower; and
signal processing means generating an alarm when the ratio of said pressure changes differs from a preset base ratio by a preselected amount.

7. The combination of claim 6 wherein said signal processing means generates an alarm when the ratio of said pressure changes differs from the preset base ratio by at least about 1%.

8. The combination of claim 6 wherein said signal processing means generates an alarm when the ratio of said pressure changes differs from the preset base ratio by at least about 5%.

9. The combination of claim 6 including temperature measuring means measuring the temperature of the hydrogen gas at the generator blower and at the purity blower, and wherein said signal processing means adjusts said ratio of pressure changes to account for differences in the temperature and pressure of the hydrogen gas at the selected portion of the ventilation system and at the purity blower.

10. The combination of claim 9 wherein the selected portion of the ventilation system is said generator blower.

11. The combination of claim 9 wherein the selected portion of the ventilation system is a designated portion of said ventilation circuit.

12. The combination of claim 6 wherein said first differential pressure measuring means measures the pressure increase across said generator blower and the pressure drop across at least one designated portion of said ventilation circuit, and wherein said signal processing means generates an alarm signal when at least one of the ratio of, the pressure increase across the generator blower and the pressure drop across the designated portion of the ventilation circuit, to the pressure increase across the purity blower differs from a preset base ratio by a predetermined amount.

13. A method of detecting a ventilation system failure in an electric power generator having a closed ventilation system in which a cooling gas is circulated by a generator blower through a ventilation circuit, said method comprising the steps of:
measuring the pressure change across a selected portion of the closed ventilation system;
measuring the pressure change across a reference blower which extracts a sample of the cooling gas from, and returns it to, the closed ventilation system;
determining the ratio of said pressure changes; and
generating an alarm when said ratio differs from a predetermined base ratio by a preselected amount.

14. The method of claim 13 wherein the step of measuring the pressure change across a selected portion of the closed ventilation system comprises measuring the pressure increase across the generator blower.

15. The method of claim 13 wherein the step of measuring the pressure change across a selected portion of the ventilation system comprises measuring the pressure drop across a designated portion of the ventilation circuit.

16. The method of claim 13 including the steps of measuring the temperature and pressure at the selected portion of the closed ventilation system and at the reference blower and adjusting said ratio of pressure changes as a function thereof.

* * * * *